United States Patent [19]

Meadows

[11] Patent Number: 4,916,308
[45] Date of Patent: Apr. 10, 1990

[54] INTEGRATED LIQUID CRYSTAL DISPLAY AND OPTICAL TOUCH PANEL

[75] Inventor: Robert D. Meadows, Beaverton, Oreg.

[73] Assignee: Tektronix, Inc., Beaverton, Oreg.

[21] Appl. No.: 258,420

[22] Filed: Oct. 17, 1988

[51] Int. Cl.$^4$ .......................... G06F 3/03; G01V 9/04
[52] U.S. Cl. .................................. 250/221; 340/712; 341/31
[58] Field of Search ............................ 250/221, 222.1; 340/712, 555, 556; 341/31

[56] References Cited

U.S. PATENT DOCUMENTS

| | | |
|---|---|---|
| 3,654,389 | 4/1972 | Pole . |
| 3,764,813 | 10/1973 | Clement . |
| 3,775,560 | 11/1973 | Ebeling . |
| 3,860,754 | 1/1975 | Johnson . |
| 4,243,879 | 1/1981 | Carroll . |
| 4,459,476 | 7/1984 | Weissmueller et al. ............ 340/712 |
| 4,645,920 | 2/1987 | Carroll . |
| 4,672,364 | 6/1987 | Lucas . |
| 4,684,801 | 8/1987 | Carroll . |

FOREIGN PATENT DOCUMENTS

| | | | |
|---|---|---|---|
| 0117322 | 6/1985 | Japan .................................... | 341/31 |
| 2082427 | 3/1982 | United Kingdom ................ | 340/712 |

OTHER PUBLICATIONS

Publication A., IBM Technical Disclosure Bulletin entitled "Light Beam Matrix Input Terminal", vol. 9, No. 5, Oct. 1966.
Publication B., Hewlett-Packard Journal, Aug. 1984, entitled "The HP 150 Touchscreen: An Interactive User Input Device for a Personal Computer".
Publication C., Electronics, Apr. 19, 1984, entitled "Touch Screens Let Your Fingers Provide a Fast, Simple Entry Into the Computer".

*Primary Examiner*—Edward P. Westin
*Attorney, Agent, or Firm*—John D. Winkelman; Patrick W. Hughey

[57] ABSTRACT

A flat panel liquid crystal display (12) with an integrated touch panel has a multitude of pixels (28) arranged in multiple columns and multiple rows. The pixels (28) of the first column (54) and last column (66), and of the first row (60) and of the last row (72) are controlled in conjunction with emitters (52, 58) and detectors (64, 70) with associated mirrors (74, 80, 82, 84) to create a sequence of light beams that extend across the display panel (12) in both the X and Y directions. Whenever a stylus (86) is placed near the display panel, two orthogonal light beams are interrupted corresponding to the X and Y positions of the stylus (86) relative to the display panel (12).

5 Claims, 2 Drawing Sheets

INTEGRATED LIQUID CRYSTAL DISPLAY AND OPTICAL TOUCH PANEL

TECHNICAL FIELD

This invention relates to an integrated liquid crystal display and optical touch panel apparatus.

BACKGROUND INFORMATION

Flat panel liquid crystal display devices typically include an array of picture elements ("pixels") arranged in multiple columns and rows. A liquid crystal display (LCD) includes a source of visible light that is reflected or projected toward the panel. Each pixel is addressable via drive circuitry that can selectively alter the molecular arrangement of the liquid crystal material associated with any pixel. The LCD is constructed so that alteration of the molecular arrangement of the liquid crystal material results in corresponding variations in the intensity of the light propagating through the associated pixel. The entire array of pixels is driven so that the light emanating from the panel defines an image.

Optical-type touch panels have been developed for use as input mechanisms for display devices. Generally, arrays of light emitters and detectors are mounted around the display screen of the display device to establish a plane of light beams passing across and near the display screen. One group of emitters is positioned across the top of the screen (in the "X" direction) and can be referred to as X-emitters. An aligned group of X-detectors is positioned across the bottom of the screen. Another group of emitters is positioned across one side of the screen (in the "Y" direction) and can be referred to as Y-emitters. An aligned group of Y-detectors is positioned across the other side of the screen.

Typically, the X-emitters are sequentially scanned from one side of the display screen to the other. The outputs of the X-detectors are monitored to detect an interruption in any X-emitter beam, the interruption being indicative of the presence of a finger or stylus near the display screen. Similarly, the Y-emitters are sequentially scanned from the top to the bottom of the display screen, and the outputs of the Y-detectors are monitored to detect an interruption in any Y-emitter beam.

Whenever a stylus is placed near the display screen, the location of the interrupted X-emitter beam and the interrupted Y-emitter beam is transmitted to the display device controller as an input representing the stylus X and Y position coordinates. The display is changed in a predetermined manner in response to that input.

Prior optical touch panels employed numerous discrete components (emitters and detectors) with associated mounting structures. Further, the resolution of prior optical touch panels is limited by the maximum number of emitters and detectors that can be mounted side-by-side across a display screen. Accordingly, the resolution of such a touch panel is generally lower than, for example, the number of pixels of the display device.

SUMMARY OF THE INVENTION

This invention is directed to an integrated liquid crystal display and optical touch panel apparatus that eliminates the need for many discrete components and their associated mounting structures, and to an apparatus that provides a resolution of a degree as high as the number of pixels of the display. The invention particularly comprises a liquid crystal display panel that has a plurality of pixels arranged in a matrix of multiple columns and rows. Each pixel is addressable by control circuitry for selectively changing the intensity of light propagating through the pixels. Visible light is projected toward the display panel and, except for the first column and last column of pixels and the first row and last row of pixels, the pixels are controlled in a conventional manner to form an image on the display panel.

Light emitters are positioned beneath the first column and beneath the first row of pixels. Pixels in the first and last column and in the first and last row can be turned "ON" or "OFF" to permit or prohibit, respectively, the propagation of the emitted light therethrough. That is, the pixels in the first column and first row are turned "ON" one at a time to produce light beams for projection across the display panel. To this end, mirrors are positioned over the first column and first row of pixels to reflect the light beams across and parallel to the display panel. Mirrors are also positioned over the last column and last row of pixels to reflect toward that column and row of pixels the associated light beams that cross the display panel.

Light detectors are positioned beneath the last column and last row of pixels. The pixels in the last column and last row of pixels are turned "ON" one at a time so that the "ON" pixel in the last column is in the same row as the "ON" pixel in the first column, and so that the "ON" pixel in the last row is in the same column as the "ON" pixel in the first row.

Whenever the user places his finger or a stylus next to the display panel, the path of two orthogonal light beams will be interrupted, this interruption being detected on the output of the corresponding light detectors. The X and Y positions of the interrupted light beams are indicative of the position of the stylus relative to the display panel.

DETAILED DESCRIPTION OF PREFERRED EMBODIMENT

Figure 1:
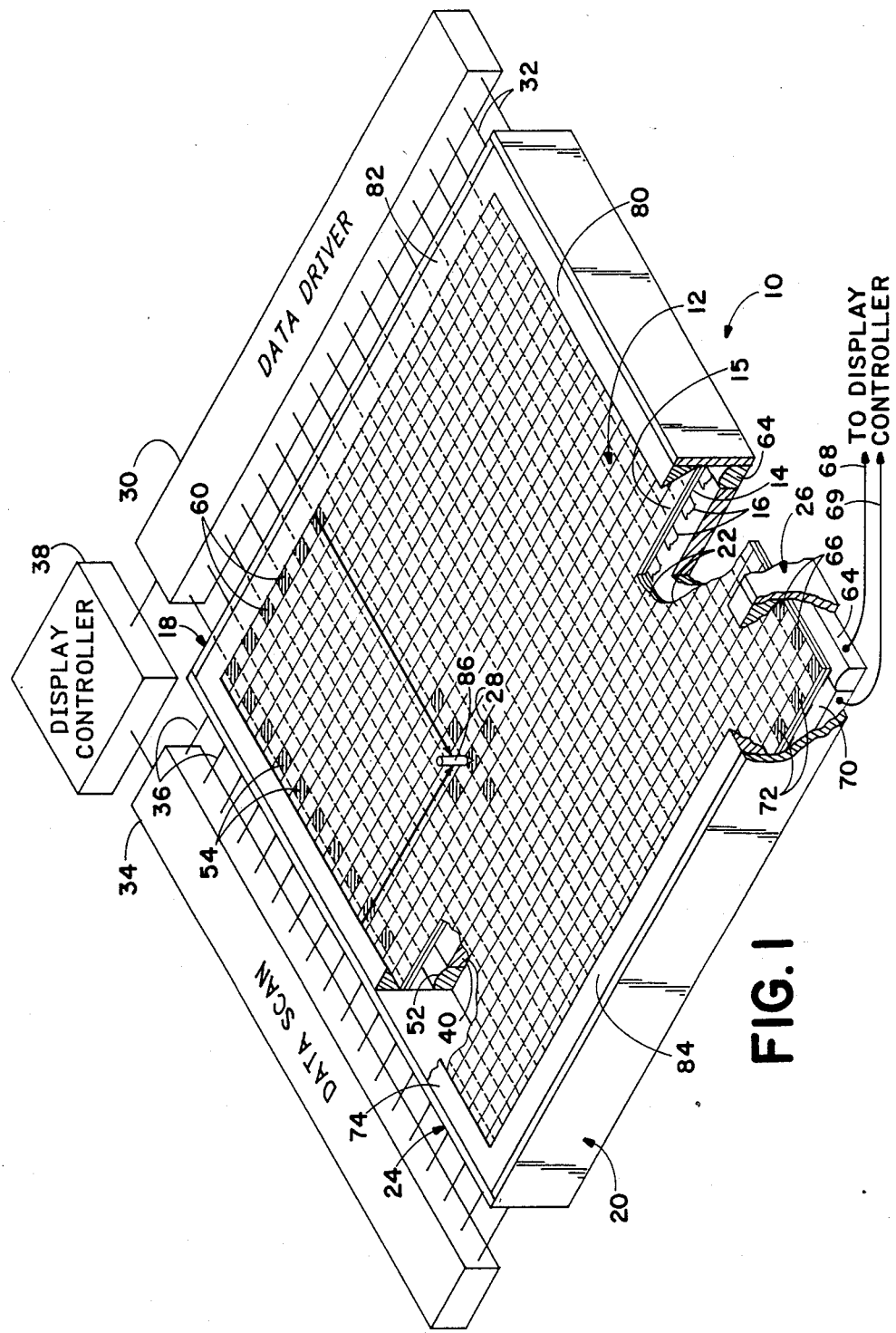
FIG. 1 is a perspective view of an integrated liquid crystal display and optical touch panel apparatus formed in accordance with this invention.
Figure 2:
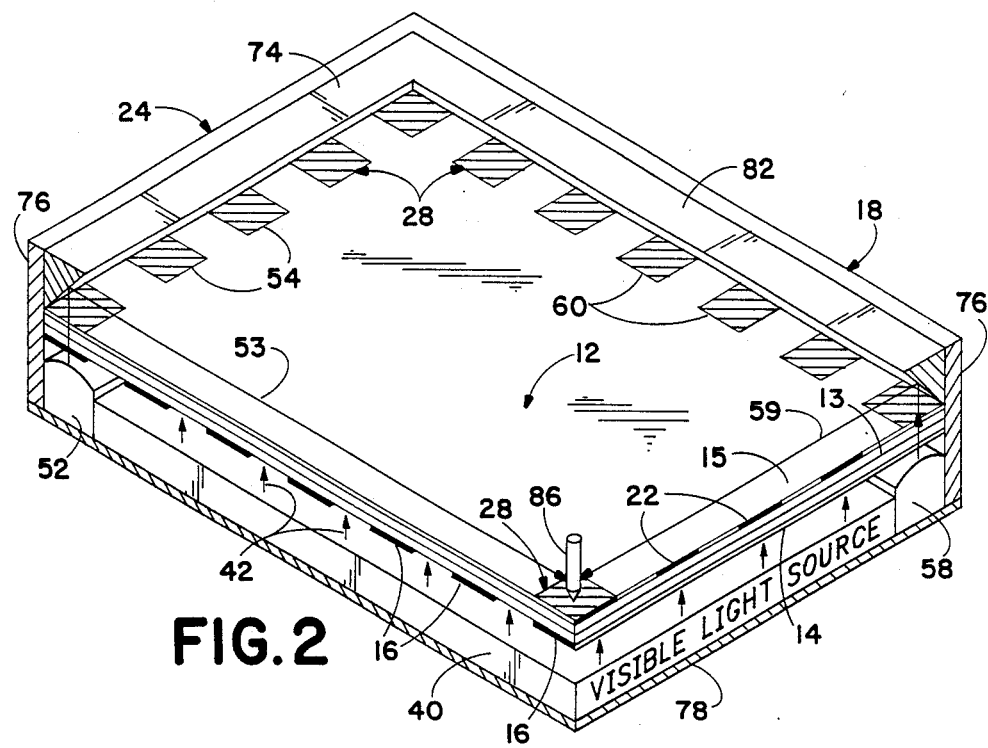
FIG. 2 is a sectional view of one corner of the apparatus of FIG. 1.
Figure 3:
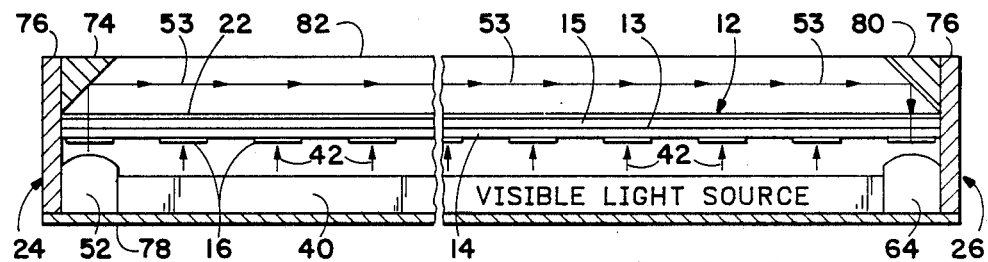
FIG. 3 is a cross-sectional view of the apparatus of FIG. 1.

FIGS. 1 through 3 illustrate an integrated liquid crystal display and optical touch panel apparatus 10 of the present invention. A preferred liquid crystal display (LCD) comprises a flat display panel 12 that includes two apart-spaced glass plates 14, 15. A thin layer of conventional nematic-type liquid crystal material 13 is sealed between the plates 14, 15. One plate 14 carries a plurality of apart-spaced parallel optically transparent electrodes 16 (hereafter referred to as column electrodes 16) that extend from the top 18 to the bottom 20 of the display panel 12. The other plate 15 of the display panel 12 carries a plurality of apart-spaced parallel optically transparent electrodes (hereafter referred to as row electrodes 22) that extend from the left side 24 to the right side 26 of the display panel 12, perpendicular to the column electrodes 16. The region between each crossed column electrode 16 and row electrode 22 defines a pixel 28. An exemplary few pixels 28 are shown cross-hatched in FIGS. 1 and 2.

The column electrodes 16 and row electrodes 22 appear in FIG. 1; however, it is understood that they are substantially transparent. Further, the size of, and spacing between, the electrodes 16, 22 are shown enlarged for clarity.

The confronting interior surfaces of the glass plates 14, 15 are treated by known methods to produce a twisted nematic-type liquid crystal cell. The function of the cell is divided over the plurality of individually addressable pixels 28.

Each glass plate 14, 15 carries a neutral density linear polarizer (not shown). The polarization plane of one polarizer is parallel to the polarization plane of the other polarizer. Accordingly, whenever visible light is projected toward any pixel 28, the light is plane-polarized as it passes through one glass plate 14. In the absence of an applied potential difference across the pixel, the polarization direction of the light is rotated 90° as the light propagates through the liquid crystal material 13. Accordingly, the light is absorbed by the polarizer on the other glass plate 15.

Whenever a potential difference is applied across a pixel 28, the molecules of the liquid crystal material 13 are realigned into an orientation that allows the plane-polarized light to propagate through the pixel 28 without changing the polarization direction. As a result, the light propagates completely through the pixel 28.

The magnitude of the potential difference applied across a pixel 28 determines the intensity of light emanating from the pixel. The magnitude of the potential difference applied to permit light to propagate completely through the pixel (i.e., the magnitude of the potential difference sufficient to realign the liquid crystal molecules so that the polarization direction of the light is unaffected) can be referred to as the "full brightness" potential. Potential differences below the full brightness potential, but greater than a zero potential, realign the liquid crystal molecules so that only a component of the plane-polarized light emanates from the pixel. By varying the amounts of light emanating from the pixel 28, an image having gray shades may be generated.

The column electrodes 16 receive voltage waveforms that are generated by a data driver circuit 30 and are applied to parallel column conductors 32 that are connected between the column electrodes 16 and the data driver circuit 30. The voltage waveforms correspond to the image data that is to be applied to the pixels 28 of a selected row. In row scan fashion, scan signals of the voltage pulse type are generated by a data scan circuit 34 and applied to row conductors 36 that are connected between the row electrodes 22 and a data scan circuit 34. For each scanned row of pixels, the voltage waveforms applied to the column electrodes 16 create a potential difference suitable for permitting propagation of the correct light intensity assigned to each pixel in that row.

A conventional display controller 38 is employed for coordinating the functions of the data driver circuit 30 and the data scan circuit 34 so that all of the pixels 28 are addressed in the correct sequence for producing an image on the display panel 12.

The embodiment shown in FIG. 1 is a projection-type LCD wherein a light source 40 is positioned behind the display panel 12 (i.e., beneath the display panel 12 as it appears in the figures). The light source 40 can be any suitable source of visible light and is shown in the figures in schematic fashion. The light source 40 is configured and arranged so that the light rays (shown as arrows 42) emanating therefrom strike the panel 12 between, but not including, the first column 54 and the last column 66 of pixels 28, and between, but not including, the first row 60 and the last row 72 of pixels 28.

In an alternative embodiment, the visible light source 40 is replaced with a light-reflecting surface for reflecting ambient light through the panel. Such an LCD is known as a reflective-type.

An light emitter, designated the Y-emitter 52, is positioned beneath the first column 54 of pixels 28 and extends from the top 18 to the bottom 20 of the display 12. The Y-emitter 52 emits light 53 toward the first column 54 of pixels 28 in a direction substantially perpendicular to the plane of the display panel 12. The Y-emitter 52 may be, for example, one or several conventional light-emitting diodes (LED's) arranged to emit a continuous beam of light along the entire length of the first column 54 of pixels.

Another light emitter, designated the X-emitter 58, is positioned beneath the first row 60 of pixels and extends from the left side 24 to the right side 26 of the display panel 12. The X-emitter 58, which is configured substantially the same as the Y-emitter 52, produces a continuous beam of light 59 along the entire length of the first row 60 of pixels 28 in a direction substantially perpendicular to the plane of the display panel 12.

A photodetector, designated the Y-detector 64, is positioned beneath the last column 66 of pixels 28 and extends from the top 18 to the bottom 20 of the display panel 12. The Y-detector 64 receives and detects along its length light that is projected to it in a direction substantially perpendicular to the plane of the display panel. The Y-detector 64 may be, for example, an array of photodiodes connected to an output conductor 68.

Another photodetector, designated the X-detector 70, is positioned beneath the last row 72 of pixels 28 and extends from the left side 24 to the right side 26 of the display panel 12. The X-detector 70, which is configured substantially the same as the Y-detector 64, receives and detects along its length light that is projected to it along a direction substantially perpendicular to the plane of the display panel 12. The X-detector 70 output is applied to an output conductor 69.

The light that is generated by the Y-emitter 52, and that passes through a pixel 28 in its path, is directed by mirrors to the Y-detector 64. In this regard, an elongated mirror, designated the left mirror 74, is mounted (for example, by attachment to an extension 76 of the LCD panel housing 78) to extend over the first column of pixels 54. The light directing surface of left mirror 74 is inclined to reflect across the display panel the light 53 that is generated by the Y-emitter 52 and that passes through a pixel 28 in the first column 54 of pixels. In this regard, the pixel through which the light passes has applied to it a potential difference suitable for permitting propagation of the light through the pixel at an intensity sufficient to be detected by the Y-detector 64. It can be appreciated that this potential difference need not be as great as the full brightness potential difference. For convenience, a pixel through which the emitted light passes with an intensity sufficient for detection will be referred to as an "ON" pixel. An "OFF" pixel passes no light.

The light reflected by left mirror 74 strikes another mirror, designated the right mirror 80, which is mounted to extend over the last column 66 of pixels. The light directing surface of right. mirror 80 is inclined to direct any light 53 striking it toward the last column 66 of pixels 28. The light 53 is directed substantially perpendicular to the plane of the display panel 12. Accordingly, the left mirror 74 and right mirror 80 define a particular optical path for the light 53 propagating between the pixels 28 in the first column 54 and the pixels in the last column 66. If the particular pixel 28 toward which the right mirror 80 reflects light 53 is "ON", the light will be detected by the Y-detector 64.

Another elongated mirror, designated the top mirror 82, is mounted to extend over the first row 60 of pixels 28. The light reflecting surface of top mirror 82 is inclined to reflect across the display panel 12 light 59 that is generated by the X-emitter 58 and that passes through any "ON" pixel in the first row 60 of pixels. The reflected light 59 strikes another mirror, designated the bottom mirror 84, which is mounted to extend over the last row 72 of pixels 28. The light reflecting surface of the bottom mirror 84 is inclined to direct the light 59 striking it toward the last row 72 of pixels 28. The light 59 is directed substantially perpendicular to the plane of the display panel 12. Accordingly, the top mirror 82 and bottom mirror 84 define a particular optical path for the light 59 propagating between pixels 28 in the first row 60 and the pixels in the last row 72. If the particular pixel toward which the bottom mirror 84 reflects light is "ON", the light will be detected by the X-detector 70.

The operation of an integrated LCD and optical touch panel apparatus 10 will now be described. Generally, the display controller 38 and associated data scan circuit 34 and data driver circuit 30 cooperate to produce an image across the display panel 12 in the conventional manner outlined above. As is known in the art, the entire display is scanned (i.e., the image is regenerated) many times a second. The time required for completing a single scan of all of the pixels 28 is called a frame time.

The portion of the display panel 12 upon which the image is generated includes all but the first column 54 and last column 66 of pixels 28, and all but the first row 60 and last row 72 of pixels 28. These columns and rows of pixels are dedicated to the control of light propagation for the purpose of determining the position of any stylus 86 placed near the display panel surface. To this end, the display controller 38 coordinates the data driver circuit 30 and data scan circuit 34 so that the pixels 28 in the first column 54 of pixels and the last column 66 of pixels will be turned "ON" one row at a time.

The frequency with which the first column 54 and last column 66 of pixels 28 is scanned depends upon the time required for the molecules of the liquid crystal material to change from the "OFF" to an "ON" state. That is, the voltage waveforms applied to turn "ON" a pixel in the first column 54 and in the last column 66 of a common row must be sustained for a time sufficient for the liquid crystal molecules to realign into the "ON" position and thereby permit the light 53 to travel through both pixels. The time required to change pixel states is within 0.1 to 20 milliseconds.

Each time the pixels 28 in the first column 54 and in the last column 66 of a common row are turned "ON", the display controller 38 reads the Y-detector 64 output that is input to the controller 38 via output conductor 68. If the Y-detector 38 output indicates little or no light received (because that light is blocked by the stylus 86), the display controller 38 stores the Y position of the "ON" pixel as the Y coordinate of the stylus 86 position.

It can be appreciated that once the X and Y position of the stylus is detected, the display controller 38 may respond in accordance with the input represented by the stylus 86 position relative to the display panel 12.

It can be further appreciated that resolution of the optical touch panel formed in accordance with this invention is the same as the number of pixels 28 of the display panel 12. Accordingly, the display panel 12 can be used to display a large selection of information (i.e., a large number of small display panel areas) from which a user may choose. Further, the present invention provides a touch panel requiring fewer parts than prior panels.

It will be obvious to those having ordinary skill in the art that many changes may be made to the details of the above-described preferred embodiment of the present invention without departing from the underlying principles thereof. For example, although a twisted nematic-type liquid crystal display has been described, it is understood that any suitable flat panel display having pixels that are controlled to act as shutters for permitting or prohibiting light passing therethrough will suffice as the display component of this invention.

I claim:
1. An integrated display and optical touch panel apparatus, comprising:
    (a) a display panel having a plurality of elements arranged in a matrix of multiple columns and multiple rows;
    (b) emitter means associated with a first column of elements for projecting light toward those elements, the first column of elements being controllable for assuming a transparent state and an opaque state, the light propagating through any one of the first column of elements that is in the transparent state;
    (c) reflection means for directing across the surface of the display panel light propagating through any element in the first column of elements; and
    (d) detection means for detecting the light reflected by the reflection means and for providing a signal indicative thereof.

2. The apparatus of claim 1 wherein the detection means includes a second reflection means for redirecting the light reflected by the reflection means toward a second column of elements, the second column of elements being controllable for assuming a transparent state and an opaque state, the light redirected by the second reflection means propagating through an element in the second column whenever that element is in the transparent state.

3. The apparatus of claim 2 wherein the reflection means and second reflection means are mirrors mounted on opposing sides of the panel, the mirrors defining an optical path along which light passing through a first pixel in the transparent state that is in the first column is directed to a second pixel that is in the second column of elements, wherein the first and second pixel are in the same row.

4. The apparatus of claim 1 further including column control means for controlling the first column of elements so that only one element is in a transparent state at any time.

5. The apparatus of claim 1 further including:
    second emitter means associated with a first row of elements for projecting light toward those elements, the first row of elements being controllable for assuming a transparent state and an opaque state, the light propagating through any one of the first row of elements that is in the transparent state;

third reflection means for directing across the surface of the display panel light propagating through any element in the first row of elements;

second detection means for detecting the light reflected by the second reflection means and for providing a signal indicative thereof; and row control means for controlling the first row of elements so that only one element is in a transparent state at any time.

* * * * *